United States Patent Office 3,182,074
Patented May 4, 1965

3,182,074
CUPRIC AND ZINC-BIS(TRIMELLITATE) DIANHYDRIDES
Donald F. Loncrini, Schenectady, N.Y., assignor to General Electric Company, a corporation of New York
No Drawing. Original application Apr. 27, 1962, Ser. No. 190,807. Divided and this application July 14, 1964, Ser. No. 388,340
3 Claims. (Cl. 260—346.3)

This is a division of application Serial No. 190,807, filed April 27, 1962.

This invention relates to new and useful compositions. More particularly, it relates to polyanhydrides which are useful as curing agents for various resinous materials such as polyesters, epoxy resins, and the like, and also as substituents for preparing polyimides and other useful polymers.

There is at present a continual emphasis on improved high temperature characteristics for resinous materials, particularly those which are to be used in electrical insulating applications and for cross-linking agents which will improve the characteristics of already existing polymeric materials.

A principal object, therefore, of this invention is to provide polyanhydrides which are useful for cross-linking polymerizable materials and for preparing polymers such as polyimides, and the like.

Briefly stated, the present invention relates to polyanhydride compositions which provide improved cross-linked polymers as well as new and novel polyimides.

Those features of the invention which are believed to be novel are set forth with particularity in the claims appended hereto. The invention will, however, be better understood and further objects and advantages thereof appreciated from a consideration of the following description.

The polyanhydrides of the present invention conform to the following general formula

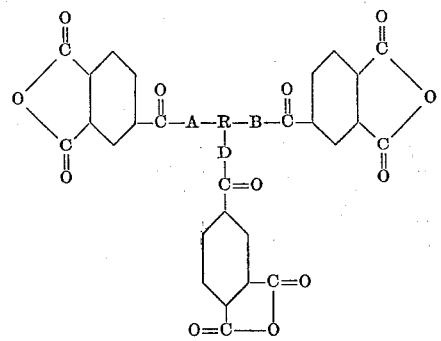

in which A can be oxygen, NH, sulfur; and the like; B can be the same as A or different within the above definition; R can be di-, tri- or polyfunctional aromatic, alicyclic, saturated or unsaturated aliphatic or a heterocyclic radical which can be either unsubstituted or substituted with other groups, such as halogen, nitro, keto, and the like. Exemplary of the aromatic radicals which can be ascribed to R are divalent aromatic radicals selected from the group having the following formulas:

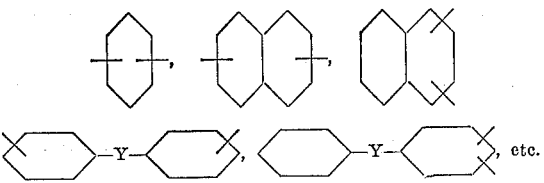

where Y represents a divalent radical selected from the group consisting of:

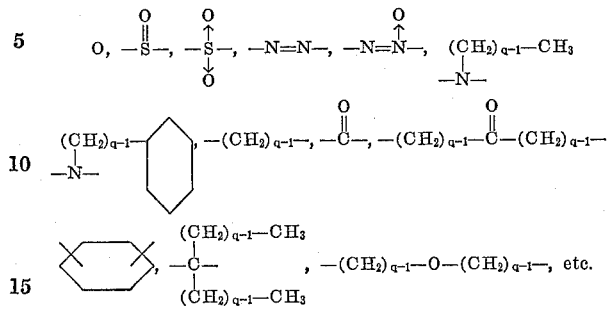

where $q$ is a positive integer of from 1 to 15. When R is a trifunctional aromatic, the anhydride can be represented by the following formula

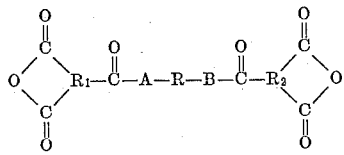

where B can be the same as A and D can be the same as A or B or these constituents can vary in any combination desired. Among the aromatic radicals which are so useful are the divalent radicals of hydroquinone; resorcinol; dihydroxy naphthalene; dihydroxy-biphenyl; 2,2-bis(4-hydroxyphenyl) propane; dihydroxybenzophenone; methyl hydroquinone; chlorohydroquinone; phloroglucinol; trihydroxy naphthalene; p-hydroxy aniline; diamino benzene; p-hydroxythiophenol, etc. In the alicyclic series R can be the divalent radical derived from cyclohexane; cyclobutane, cyclopentane, and the like. In the aliphatic series R can be $$-(CH_2)_{q-1}-$$
$$(CH_2)_{q-1}-O-(CH_2)_{q-1}-$$
$$-(CH_2)_{q-1}-(CH-CH)_{p-1}-(CH_2)_{q-1}-$$
$$-(CH_2)_{q-1}-(C\equiv C)_{p-1}-(CH_2)_{q-1}-, \text{ etc.}$$

where $q$ is a positive integer from 1 to 15 and $p$ is a positive integer from 1 to 5, and is typified by the residue of ethylene glycol, diethylene glycol, polyethylene glycol, neopentyl glycol, 2,2-dibromo methyl-1, 3-dihydroxy propane, 1,6-dihydroxyhexane, ethylene diamine, ethanol amine, glycerol, sugars, and the like. In the heterocyclic series, R can be the di-, tri- or other polyvalent residue radicals of dihydroxy pyridine dihydroxy thiophene, dihydroxy carbazole, diamino pyridine, etc. R can also be a polyvalent metal such as Fe, Cu, Zn, Al, alkaline earth, etc., organometallic,

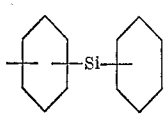

etc. $R_1$ and $R_2$ can be di-, tri- or other polyfunctional aromatic radicals such as phenyl, naphthyl, phenanthryl, etc., or aliphatic radicals, such as propyl, butyl, pentyl, hexyl, octyl, decyl, etc., two of the carboxy groups being adjacent to form the anhydride.

Generally speaking, the anhydrides of the present invention can be readily prepared in quantitative yields by an acidolysis reaction between one mol of tricarboxy acid or anhydride per equivalent of a compound containing a plurality of ester or amido groups or mixtures of such groups, preferably less than about six of such groups per molecule. This acidolysis reaction takes place conveniently at from 125° C. to 325° C. and is unique in the sense that the reaction takes place on the No. 4 carboxylic acid position, thus leaving the anhydride positions intact. For example, in the case of trimellitic anhydride, only the free No. 4 carboxylic acid group reacts leaving intact the anhydride linkage. If trimellitic acid is used, then the 1,2-dicarboxylic acid groups form the anhydride by splitting out one molecule of water before the transesterification reaction proceeds. In either case, the reaction products are the same. Among the other tribasic materials which can be used besides trimellitic anhydride or its acid are 1,2,4-naphthalene tricarboxylic acid, 1,4,8-naphthalene tricarboxylic acid, 1,2,4-butane tricarboxylic acid, 1,2,3-benzene tricarboxylic acid, 1,2,3-propane tricarboxylic acid and 2,3,6-naphthalene tricarboxylic acids or their corresponding anhydrides, among others. In preparing the anhydrides, equivalent parts of a suitable ester or amide are reacted with one mol of trimellitic anhydride, for example, or other tribasic material as described above either in the presence or absence of solvents and with or without catalysts of the transesterification type. Among the solvents which are useful in connection with the present invention are the chlorinated aromatic materials such as chlorinated diphenyls, diphenyl ether, etc. Among the transesterification catalysts which are well known to those skilled in the art are MgO, Mg, $Li_2CO_3$, $H_2SO_4$, $HgSO_4$, etc. Generally, reaction takes place in a temperature range of from about 125° C. to 300° C. and is complete when the theoretical amount of lower boiling acid has been removed by distillation. Normally, this takes place between 30 and 100 minutes. In general, any acid derivative of a hydroxy, amino, mercapto, etc. compound can be used in the transesterification reaction such as formate acetate, propionate, butyrate, benzoate, and the like. The corresponding amides can also be used. However, from the point of view of convenience and economy of raw materials the acetates are preferred. It will be realized, of course, that when the ester or amide, for example, is of such low boiling point that reaction does not take place, other suitable derivatives should be used.

The following examples will illustrate the practice of the invention, it being realized that such examples are illustrative only of the many facets of the invention which are intended to be covered herein.

*Example 1*

One mol (192 grams) of TMA (trimellitic anhydride) and 0.5 mol (97 grams) of hydroquinone diacetate were mixed with 500 cc. of chlorinated diphenyl and with stirring heated to 300° C. for three hours. At the end of this time, a total of 60 grams of acetic acid had distilled over. The reaction mixture was cooled to 80° C. and 4 volumes of normal n-heptane added to produce precipitation of the product which was then filtered, washed three times with diethyl ether and dried under vacuum. A total of 200 grams of product was obtained which, after hydrolysis, had a neutral equivalent of 121 as against a theoretical 123. The yield was 88.9 percent of theory. This compound, hydroquinone-bis-trimellitate anhydride or paraphenylene-bis(trimellitate)dianhydride, was found to be effective in cross-linking polyester resins.

*Example 2*

Six mols of trimellitic anhydride and 3 mols of hydroquinone diacetate were heated with stirring for 100 minutes to a maximum temperature of 302° C., the acetic acid being distilled off as it formed. On cooling, a total of 1372 grams of product was recovered as in Example 1 having a melting point of 255° C., this material being characterized as hydroquinone-bis-trimellitate anhydride or paraphenylene-bis(trimellitate)dianhydride which is useful as a cross-linking agent.

*Example 3*

Example 2 was repeated using 4 mols of trimellitic anhydride and 2 mols of neopentyl glycol diacetate to produce neopentyl glycol-bis-trimellitate anhydride or neopentyl-bis(trimellitate) dianhydride having a melting point of 50° C.

*Example 4*

Example 2 was repeated using 1 mol of trimellitic anhydride and 0.5 mol of Bisphenol-A diacetate to produce a 97 percent yield of product in about one hour having a melting point of about 100° C. This material may be characterized as Bisphenol-A-bis-trimellitate anhydride or, 2,2-bis(p-trimellitoxy phenyl) propane dianhydride.

*Example 5*

There were reacted together, as in Example 2, one mol of trimellitic anhydride and 0.25 mol of pentaerythritol tetra acetate which over a two-hour period of reaction at a maximum temperature of 230° C. produced pentaerythritol-tetra-trimellitate anhydride or pentaerythritol-tetra (trimellitate) tetra anhydride having a melting point of 129° C. and a neutral equivalent of 101.

*Example 6*

There were mixed together 2.1 moles of trimellitic anhydride and 0.7 mol of glycerol triacetate which after three hours of reaction at a maximum temperature of 295° C. produced glycerol-tris-trimellitate anhydride or glyceryl-tris(trimellitate) dianhydride having a melting point of 95° C.

*Example 7*

One mol of trimellitic anhydride and 0.5 mol of p,p'-phenylene bis-acetamide were mixed together and heated for 100 minutes is a top temperature of 310° C. The p,p'-phenylene bis-trimellitamide anhydride or paraphenylene-bis(trimellitamide) dianhydride had a melting point greater than 325° C.

*Example 8*

There were mixed together one-half mol of trimellitic anhydride, 0.25 mol of p-acetoxy-acetanilide and 350 cc. of chlorinated diphenyl with heating and stirring over a 65-minute period to a top temperature of 320° C. The mixture was cooled to 80° C., precipitated with n-heptane, filtered and washed once again with n-heptane to give a material having a melting point greater than 325° C.

*Example 9*

Two mols of trimellitic anhydride, 1.0 mol of ethylene carbonate and 250 cc. of orthodichlorobenzene were added with stirring to a top temperature of 190° C. for a period of three hours. There were btained 405 grams ethylene glycol-bis-trimellitate anhydride or ethylene-bis(trimellitate) dianhydride having a melting point of 134° C.

*Example 10*

Example 9 was repeated without using the orthodichlorobenzene. When 3 mols of trimellitic anhydride and 1.5 mols of ethylene carbonate were heated for 3 hours at a top temperature of 247° C., the product of Example 9 was obtained having a melting point of 134° C.

*Example 11*

There were mixed together 1 mol of trimellitic anhydride, 0.5 mol anhydrous zinc acetate and 600 cc. of chlorinated diphenyl which were heated to a top temperature of 315° C. for a period of 120 minutes. There were obtained 221 grams of final product known as zinc-bis trimellitate anhydride or zinc-bis(trimellitate) dianhydride having a melting point greater than 320° C.

*Example 12*

One-half mol of copper acetate monohydrate was stirred and heated in 500 cc. of chlorinated diphenyl to a temperature of 200° C. in order to dehydrate the copper salt. The mixture was then cooled to 100° C. at which point one mol of trimellitic anhydride was added and the heating continued for one hour to a top temperature of 285° C., the theoretical amount of acetic acid being collected. The final product obtained by cooling to 80° C., precipitating with n-hexane and filtering and washing with n-hexane was cupric-bis-trimellitate anhydride or cupric-bis(trimellitate) dianhydride having a melting point of over 325° C.

*Example 13*

There were mixed together one mol of trimellitic anhydride, 0.5 mol of diacetoxydiphenyl silane and 500 cc. of Aroclor #1242, a chlorinated diphenyl material manufactured by the Monsanto Chemical Company, with heating over a 90-minute period to a maximum temperature of 275° C. The mixture was then cooled to about 80° C. and precipitated with n-hexane after which the mother liquors were decanted off. Methylene chloride was added to the resultant solid and the product was filtered. There were obtained 278 grams of diphenyl silyl-bis(trimellitate) dianhydride product having a melting point of 115° C. for a 98 percent yield.

*Example 14*

Two mols (384 grams) of trimellitic anhydride and one mol (146 grams) of ethylene glycol diacetate were heated together over a three-hour period to a maximum temperature of 290° C., a trace of p-toluene sulfonic acid being used as a catalyst. The resultant mixture was cooled to room temperature after which 250 grams of chlorinated diphenyl were added and the product precipitated with n-hexane. After washing twice with n-hexane, there was obtained a quantitative yield of ethylene-bis(trimellitate) dianhydride product melting at about 130° C. to 134° C. which had a neutral equivalent of 102.

*Example 15*

There were mixed together 95 grams (0.5 mol) of 1,2,4-butanetricarboxylic acid and 48.5 grams (0.25 mol) of hydroquinone diacetate, along with 500 grams of Aroclor chlorinated diphenyl, heating taking place for 90 minutes to a maximum temperature of 275° C. A total of 30 grams of acidic acid was collected and the mixture cooled to 80° C., precipitated with n-hexane, washed two times with n-hexane, filtered and dried. A quantitative yield of paraphenylene-bis(tricarballylate) dianhydride was obtained having a neutral equivalent of 102.

*Example 16*

To 1536 grams (8.0 mols) of trimellitic anhydride suspended in 1500 cc. of chlorinated polyphenyl, there were added 696 grams (4.0 mols) of ethylene diacetamide. The mixture was stirred and heated to a maximum temperature of about 290° C. over a period of 3½ hours during which time a total of 472 grams of acetic acid was distilled over corresponding to a 98.5 percent yield. The cooled reaction mixture was poured with rapid stirring into six liters of boiling hexane, filtered and then washed three times with boiling hexane for a final yield of 396 grams of ethylene diamine-bis-trimellamide anhydride or ethylene-bis(trimellitamide) dianhydride melting at 365° C. and having a nuetral equivalent of 100.

*Example 17*

There were added to 738 grams (3.0 mols) of trimethylol ethane triacetate 1788 grams (9 mols) of trimellitic anhydride, the mixture being stirred and heated to a maximum temperature of 320° C. for five hours. A total of 540 grams of acetic acid was collected. The 640 grams of product corresponding to a 99.8 percent theoretical yield had a melting range of 85 to 87° C. and a neutral equivalent of 105. This material may be characterized as trimethylol ethane-tris-trimellitate anhydride or 1,1,1-tris(trimellitoxy methyl)ethane trianhydride.

It will be realized by those skilled in the art that many other materials falling within the above definitions may be used in the preparation of the present materials. Thus, for example, materials may be prepared using trimellitic anhydride and materials or derivatives of materials such as p-phenylene diamine diacetate, m-hydroxyaniline, phloroglucinol, 1,3-cyclobutane diol, diethylene glycol, 1,4-butene diol and 3,5-dihydroxy pyridine.

It has been found that the anhydrides of the present invention are particularly suitable as curing agents for polyesters, epoxy resins and other resins in general containing hydroxy or other reactive groups. It has been found, for example, that polyesters prepared from ethylene glycol, glycol and acids or anhydrides, such as isophthalic acid, terephthalic acid and derivatives thereof, provide materials having good physical strength and salutary electrical characteristics along with good bond strength. The materials have also been found to be efficacious as curing agents for epoxy resins of the usual types. They are also useful for preparing other materials such as polyimides.

What I claim as new and desire to secure by Letters Patent of the United States is:

1. A material selected from the group consisting of zinc-bis-(trimellitate) dianhydride and cupric-bis-(trimellitate) dianhydride.
2. Zinc-bis-(trimellitate) dianhydride.
3. Cupric-bis-(trimellitate) dianhydride.

No references cited.

NICHOLAS S. RIZZO, *Primary Examiner.*